United States Patent [19]

Gould

[11] Patent Number: 4,721,355

[45] Date of Patent: Jan. 26, 1988

[54] OPTICAL CABLE CONNECTOR ASSEMBLY INCLUDING BREAKABLE LINK AND PROCESS USING SAME

[75] Inventor: Gordon Gould, Great Falls, Va.

[73] Assignee: Chevron Research Company, San Francisco, Calif.

[21] Appl. No.: 623,855

[22] Filed: Jun. 22, 1984

[51] Int. Cl.[4] .................. G02B 6/36; E21B 29/00; H02G 3/00; H04H 9/00

[52] U.S. Cl. ................. 350/96.20; 350/96.21; 350/96.23; 350/320; 166/297; 166/54.5; 166/55; 166/113; 174/70 R; 367/81

[58] Field of Search ............. 350/96.10, 96.20, 96.21, 350/96.22, 96.23, 320; 166/244.1, 297, 298, 299, 301, 54.5, 54.6, 113, 55; 174/70 S, 70 R; 367/81, 82, 86

[56] References Cited

U.S. PATENT DOCUMENTS

| | | | |
|---|---|---|---|
| 3,517,740 | 6/1970 | Johnson | 166/54.5 |
| 3,829,937 | 8/1984 | Metzler | 24/122.6 |
| 4,504,112 | 3/1985 | Gould et al. | 350/96.23 |
| 4,505,540 | 3/1985 | Furusawa et al. | 350/96.20 |
| 4,522,464 | 6/1985 | Thompson et al. | 350/96.23 |
| 4,523,804 | 6/1985 | Thompson | 350/96.23 |
| 4,598,290 | 7/1986 | Collins et al. | 350/96.20 X |
| 4,674,832 | 6/1987 | Hirai et al. | 350/96.21 |
| 4,678,270 | 7/1987 | Gunn et al. | 350/96.20 |

FOREIGN PATENT DOCUMENTS 2104752A 7/1982 United Kingdom ............. 350/96.20

OTHER PUBLICATIONS

"Underwater Electrical Cable Terminations" by O. E. Lamborn, Oceans (1977) MTS IEEE.
"Underwater Electrical Cable and Connector Seals: Some . . . " by C. J. Sandwith et al., Oceans, 1977, MTS-IEEE.
"Development of Field Installable Terminations for Cables . . . " by W. F. Strange et al., Ocean, 1977, MTS IEEE.
"Fiber Optic Data Transmission System for Borehole Logging" by G. Gould, Optelecom, Final Report, Aug. 14, 1981.
"Evaluation of Optical Fiber Cable for Transmission of . . . " by Optelecom, Inc., Dec. 19, 1979.
"Fiber Optic Logging Cable System" by Optelecom, Inc. (Mar. 1984).

Primary Examiner—William L. Sikes
Assistant Examiner—Brian M. Healy
Attorney, Agent, or Firm—E. J. Keeling; A. Stephen Zavell; V. A. Norviel

[57] ABSTRACT

A cable connector assembly capable of mating to an armored optical cable and providing a hermetically sealed electronics cavity is described. A connector assembly provides a means for placing electronics in an electronics cavity. The electronics are capable of converting electrical signals to optical signals or optical signals to electrical signals within the electronics cavity in the connector assembly so that optical to optical matching of optical fibers is unnecessary. The connector contains a means for anchoring the armoring wire of the armored optical cable and at least two-spaced apart means for sealing the electronics cavity from leakage of pressure around the optical fiber cable. Furthermore, the connector assembly contains a means for passing the optical fiber core through a breakable link before termination in the electronics cavity.

17 Claims, 5 Drawing Figures

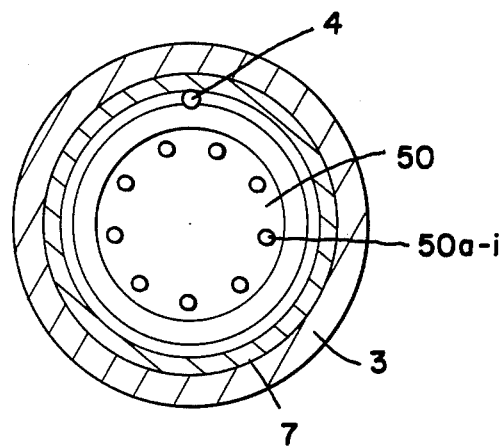
FIG _ 2
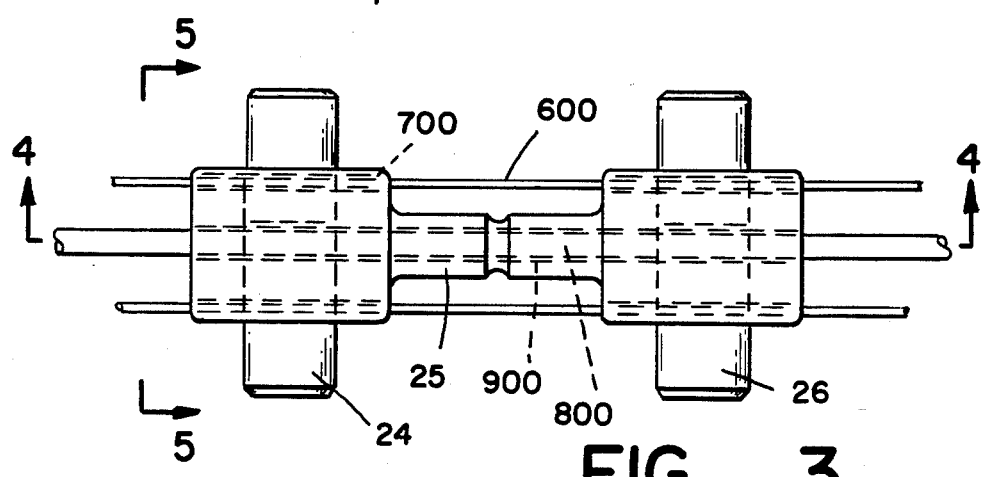
FIG _ 3
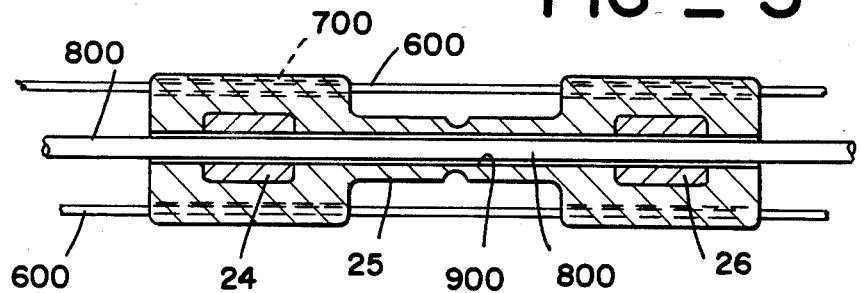
FIG _ 4
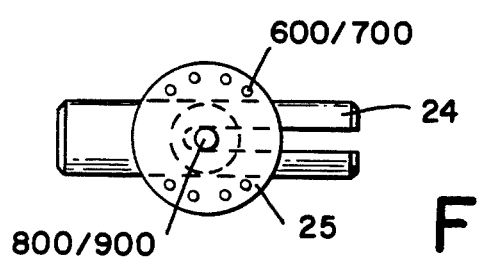
FIG _ 5

OPTICAL CABLE CONNECTOR ASSEMBLY INCLUDING BREAKABLE LINK AND PROCESS USING SAMEW

FIELD OF THE INVENTION

The invention relates to a cable connector assembly. More specifically, the invention relates to an optical cable connector assembly.

BACKGROUND OF THE INVENTION

Cable connector assemblies are used at the termination of a cable to enable the quick connection or disconnection of a device, such as a well logging sond or a hydrophone. The cable connector assembly permits the substitution of different sonds without the need for a separate cable for each sond. This procedure has been used with standard electrical cables.

As the number and complexity of the downhole measurements increase, the data that must be transmitted up an electrical cable strains capacity to carry the information. This limits the number and complexity of the measurements that can be taken and/or requires preprocessing of the data downhole to limit the amount of information that is transferred along the cable.

Optical well logging cables provide a solution to the limitations of standard electrical cables and offer increased data transmission rates and much larger data carrying capacity. Previously, the optical cable connector assembly terminated on the cable and had to mate to an optical receiver in the sond. However, this procedure required precise alignments between the optics or optical fibers in the sond and the cable connector assembly. It also required cleanliness seldom encountered in such harsh environments to avoid loss of signal transmission across the interface. U.S. application Ser. No. 285,146, filed July 20, 1981, now abandoned, completely incorporated herein by reference for all purposes, disclosed a cable connector assembly wherein the light signals to be transmitted up or down the optical cable are converted into electrical signals in the cable connector assembly. This permitted the mating of an optical cable with conventional electrical sonds without the need of a precise transmission of light through a make/break connector interface. However, the connector disclosed therein was limited in that the sond and cable could not be disengaged in an emergency if the sond became lodged in a well bore and it was necessary to extract the cable alone. Furthermore, the connector did not seal individual conductors in individual units. And finally, as the temperature increases it would be desirable to have a hermetic seal on the sond end of the cable connector assembly, i.e., the interface between the electrical pin conductor and the sond. Still an additional desirable feature is a separate sealing system to isolate the electronics cavity from the cable termination and a sealing system surrounding the termination of the conductor elements in the optical fiber which can be tested at pressure to determine the integrity of the system prior to the insertion into a high pressure environment such as a well bore.

SUMMARY OF THE INVENTION

I have invented a cable connector assembly which possesses all the desirable features described above as well as additional benefits, and which are apparent to any ordinary skilled artisan, amplified hereinafter. The cable connector will be described with respect to its interfacing to the optical well logging cables described in U.S. applications Ser. Nos. 408,971 now U.S. Pat. No. 4,504,112; 408,972 now U.S. Pat. No. 4,522,464 and 408,975 now U.S. Pat. No. 4,523,804 all of which were filed on Aug. 17, 1982. These applications are to be completely incorporated herein by reference for all purposes. However, the connector assembly is not limited to interfacing with those specific cables. Obvious modifications to the termination of the armor wirings will render the cable connector assembly suitable for use with other optical cables.

The cable connector assembly is connected to the end of an optical fiber cable which is to be inserted into a well bore. The cable is inserted into and terminated in an electronics cavity in the connector assembly which contains at least one means for converting optical to electrical signals and/or electrical to optical signals such that only electrical signals pass between the sond and the connector assembly. The connector includes a means for anchoring the armoring of the optical fiber cable. At least two-spaced apart means for sealing and defining an electronics cavity therebetween. The sealing means adjacement the means for anchoring seals the electronics cavity from leakage around the optical fibers and the conductor wires. The connector assembly also contains means for passing the optical fiber core through a breakable link before termination in the electronics cavity.

BRIEF DESCRIPTION OF THE DRAWINGS

FIG. 2 illustrates a view and cross-section of the connector assembly from the perspective of position 2 in FIG. 1.

FIG. 3 is a top plan view of the breakable link with provisions for the conductor elements and the optical fiber in phantom.

FIG. 4 is a cross-sectional view of the breakable link in FIG. 3 along line 4.

FIG. 5 is an end view of the breakable link in FIG. 3 along line 5 illustrating the dowel pin partially in phantom and the individual passage around the pin for the conductor wires.

DETAILED DESCRIPTION OF THE INVENTION

Figure 1:
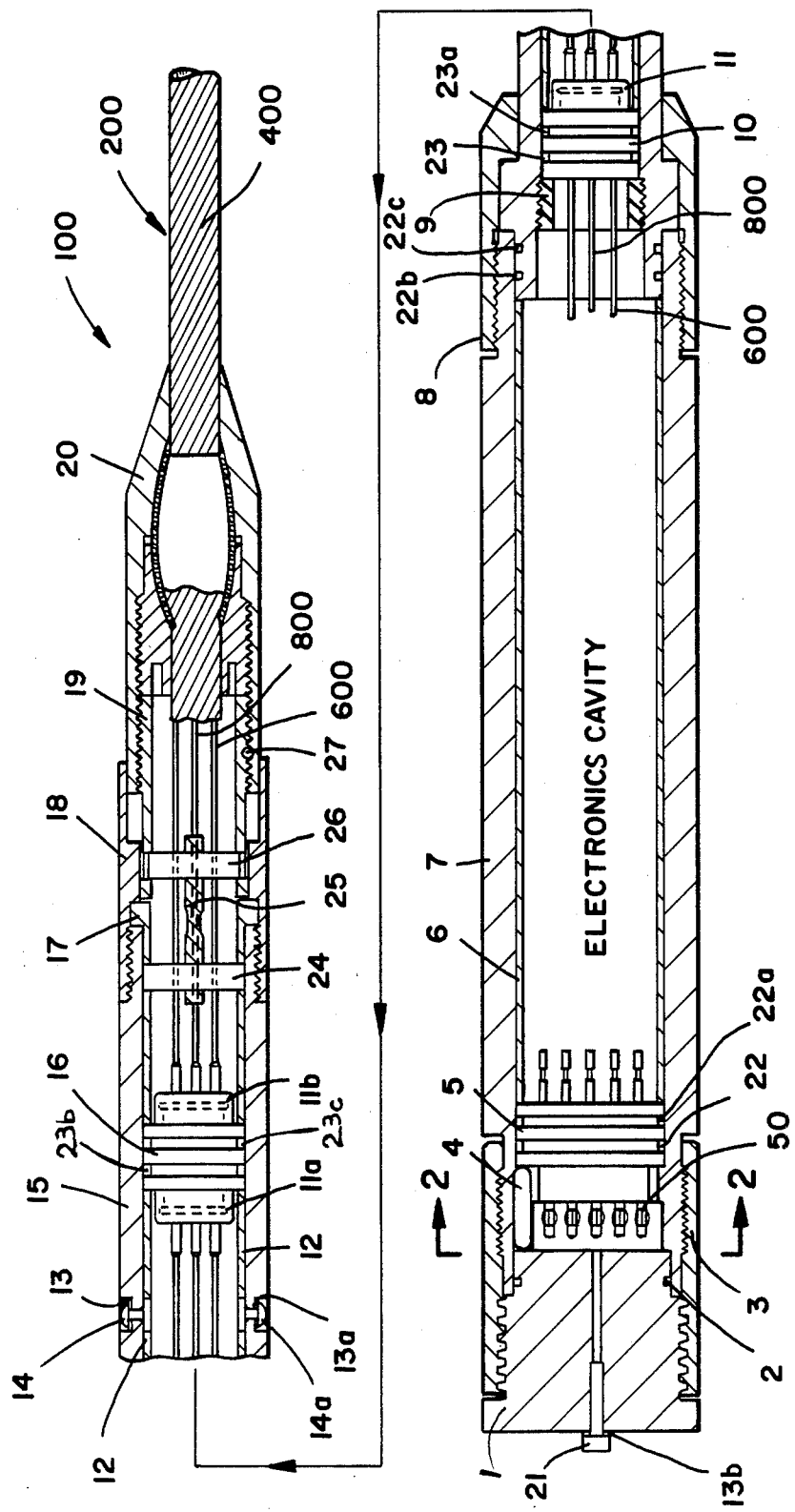
FIG. 1 illustrates a cross-sectional view of the cable connector assembly of my invention.

The invention will be more clearly illustrated by referring to the accompanying Figures. The cable connector will be described with respect to fitting an armored optical cable having an outer diameter of about 0.469 inch as described in U.S. application Ser. Nos. 408,972, and 408,975. However, it should be understood that the connector assembly can be sized to form a termination for any armored optical cable.

More specifically, the cable connector is designated as 100 in FIG. 1. The preferred cable connector 100 attaches to an armored optical fiber well logging cable 200 through the armor wires 400. The connector 100 has an approximate length of about 34.25 inches with an outer diameter at the widest point of about 3.375 inches. The electronics cavity has a length of about 12 inches and an inner diameter at the widest point of about 2.25 inches. From the widest point of the connector, it necks down to a diameter of about 2.25 inches wherein the electrical conductors 600 and the optical fibers 800 are sealed and terminated. The necking down of the connector assembly is designed so as to mate the armored wires 400 of the cable 200 at a standard armored cable terminator such as one designed by Preform Line Products Company of Cleveland, Ohio. The terminator secures the inner and outer armor wires 400 of the cable. Having generally described the preferred dimensions of the cable connector 100, the specific details thereof are more clearly illustrated by referring to FIG. 1.

The cable connector 100 includes a means for sealing the connector at the point at which it interfaces with the sond. The sealing means is illustrated as plug 1. The plug 1 further includes a screw 21 and lock seal washer 13b between the screw 21 and the plug 1. The plug 1 protects the portion of the engaging nut 3, which threadedly engages a sond, from dirt and grease when the connector assembly 100 is not in use. An O-ring 2 seals the cap seal plug to the inner opening of the front shell 7. Any sond connected thereto should also have a provision for an O-ring seal 2.

The engaging nut 3 also threadedly engages the front shell 7. The front shell 7 contains a pin insert 5 positioned therein by a spacer tube 6 on the end of front shell 7 which mates with the engaging nut 3. The sealing means, O-rings 22 and 22a, seal the pin insert 5 in the front shell 7 and define an end of the electronics cavity. The front shell 7 protects the electronics cavity from the outside environment. The number and size of the threads between the engaging nut 3 and the front shell 7 and sond are determined by the pressures and temperatures to which the apparatus will be subjected and the need to seal and mate the sond to the connector assembly 100.

The pin insert 5 has a multilam contact 50 attached therein. A dowel pin 4 serves as the locator point for mating up the multilam contact 50 to the appropriate female connector in the end of a sond. A view of the means for engaging and contacting the sond portion of the apparatus 100 is more clearly illustrated in FIG. 2.

FIG. 2 is a cross-sectional view of the connector 100 along lines 2, illustrated in FIG. 1. The multilam contact 50 contains male contact pins 50A for insertion into the female receptacle in the sond. Of course, the contact could be configured so that the male pins 50A are in the sond and the female receptacle would be in the multilam contact 50. In addition, pin insert 5 can also contain multilam female inserts interior to within male pins 50A or between the pins. The multilam contacts 50 provide a pressure tight seal for the transfer of electrical power or electrical signals between the sond and the electronics cavity. The pins 50A are properly mated up by the pin dowel 4 which forces the male and female contacts to engage in a predetermined pin to receptacle configuration.

An electronics cavity is formed between the interior proportions of the pin insert 5 abutting the spacer tube 6 and the end opposite thereto contacting the tension rod shell 15. A typical electronics cavity has a length of about 12 inches and a diameter of about 2.25 inches. However, the size of the electronics cavity is limited only by the need of the optical to electrical conversion electronics and any other hardware that may be desired to be placed within the electronics cavity. Suitable additional electronics would be optical modulators, such as those described in the U.S. application Ser. No. 285,146.

The tension rod shell 15 contacts front shell 7 and is threadedly fixed with a second engaging nut 8. The front shell 7 and the tension rod shall form a connector housing. Although it would be more difficult to disassemble, the housing could be formed from a unitary tubular member. The front shell 7 seals to the tension rod 15 on its inner surface through sealing means o-rings 22b and c. These o-rings provide a further seal between the insert feed-through insert 10 and the tension rod 15. The feed-through insert 10 also seals the cavity and is held in place by the retaining nut 9 threadedly engaged in the tension rod 15 and the spacer tube 12. The feed-through insert 10 and feed through boot 11 permit the cable conductors 600 and optical fibers 800 to pass therethrough to the electronics cavity while providing a back-up seal to the outside environment. The conductor wires 600 and optical fiber core 800 is individually sealed by the feed-through insert and boot 10 and 11, respectively. The feed-through 10 further includes additional sealing means, such as o-rings 23 and 23A. The feed-through boot seal 11 is fabricated from suitable sealing materials, such as natural rubber, Viton ® and the like. Higher temperature use of the connector assembly 100 favors the use of materials like Viton ®.

Between feed-through insert 10 incorporating feed-through boot 11 and feed-through 16 incorporating feed-through boot 11A is a cavity formed therebetween for pressure testing the individual seals surrounding the conductors 600 and the optical fiber 800 of the cable 200. The spacing for a pressure test cavity between feed-through insert 10 and feed-through insert 16 is provided for by spacer tube 12. Access to the pressure test cavity is through button screws 14 sealed in the tension rod shell 15 by sealing means O-rings 13 and 13a. The feed-through insert 16 is sealed within the tension rod shell 15 by sealing means O-rings 23b and 23c.

The feed-through insert 16 contains an additional feed-through boot 11b on the end of the insert 16 opposite to the end containing the feed-through boot 11A. The feed-through insert 16 with O-rings 23b and 23c and feed-through boot 11b form the main seal to the electronics cavity when the connector is in a pressured environment. The feed-through insert 10 with o-rings 23 and 23a and feed-through boot 11 form a second back-up seal for the electronics cavity when the connector is in a pressured well bore environment. The feed-through inserts 10 and 16 individually seal the conductor wire 600 and optical fiber core 800 to provide a pressure tight seal to the electronics cavity. Thus, an up-hole, i.e. ambient environment pressure, test cavity to test the seals is defined between feed-through inserts 10 and 16 while the actual sealing of the electronics cavity is on the sides of the feed-throughs containing the boots 11 and 116b.

Since the feed-through boots 11, 11a and 11b provide additional sealing, the electronics cavity is sealed by two hard seals 10 and 16 and the soft boot seals 11, 11a and 11b. A unique feature of this connector assembly 100 is the multi-step individual sealing around the conductor wires 600 and optical fiber core 800. This provides additional protection to the electronics package for extended use at high temperatures and pressures. Preferably, the feed-through boots 11, 11a and 11b are maintained with an inward pressure in use so as the temperature rises, have a tendency to squeeze down on the conductors 600 and the core optical fibers 800 to maintain the seal for the electronics cavity. Further, additional sealing is provided for by adding silicone grease and the like around all inserts and boots.

On the end of tension rod 15 opposite to the end in communication with the electronics cavity is a retaining collar 17 which positions the feed-through insert seal 16 in an appropriate position. The retaining collar 17 is held in place by an engaging nut 18 which threadedly engages the tension rod shell 15. The engaging nut 18 also contacts and abuts an armor termination adaptor 19. The armor termination adaptor 19 is a termination point for the armor wires 400. The adaptor 19 along with the armor termination assembly 20 secure the armored optical cable 200 to the connector 100.

The cable connector 100 also contains a tension rod comprising the rectangular U-shaped dowel pins 24 and 26 and a hollow tension rod 25. The hollow tension rod 25 permits the passage of the conductors 600 through the outer portions thereof while the optical fiber 800 passes through the hollow center. The tension rod design creates a breakable link which permits the extraction of the cable 200 from the sond and cable connector 100 if the cable connector 100 and sond become trapped or wedged in a well bore. This prevents damage to the optical fiber cable. The hollow tension rod 25 is configured so as to break at a tension which is about the maximum working strength of the cable. The working strength of the cable is a function of its design and the stretch limitations of the components such as optical fibers used therein. Generally, the hollow tension rod 25 should be designed to break at a tension which is equal to or slightly less than the elastic in-elastic transition of the cable. For the cable connector 100 illustrated a suitable tension is about 7000 to 8000 pounds.

The tension rod assembly, i.e., breakable link, is more clearly illustrated in FIGS. 3, 4 and 5. FIG. 3 illustrates a top plan view of the tension rod assembly containing the hollow tension rod 25 and the rectangular U-shaped dowel pins 24 and 25. The tension rod has means, i.e. passages 700 and 900 therethrough, for passing the conductor elements 600 and optical fiber elements 800 therethrough. These passages are illustrated as dashed lines 700 and 900, respectively. The ends of the passages are chamfered to avoid cutting the insulation, not illustrated, surrounding the conductor wires 600. A cross-sectional view of the tension rod assembly along line 4. FIG. 4 more clearly illustrates the configurations of the rectangular U-shaped dowel pins 24 and 26 and the hollow tension rod 25 including passages 700 and 900. The eight conductor elements 600 are spaced around where the dowel pins 24 and 26 fit through the hollow tension rod 25. The configuration of the passages 700 for conductor elements 600 is more clearly illustrated by referring to the end view in FIG. 5 along line 5 of FIG. 3. FIG. 5 illustrates the configuration of the rectangular U-shaped dowel pins 24 and 26 through the hollow tension rod 25 containing passages 700 and 900 through which the conductor elements and the optical fibers 600 and 800, pass respectively. The central hollow passage through hollow tension rod 25 permits the optical fibers 800 to pass therethrough without bending or kinking around the breakable link assembly of elements 24, 25 and 26. The U-shape of the dowel pins 24 and 26 surround the optical fiber.

Returning to FIG. 1, the armoring of the cable is terminated in a standard armor cable termination assembly 20 such as one manufactured by Preform Line Products. The armor termination assembly 20 includes the armor termination adaptor 19 for mating the armor termination assembly 20 to the connector 100 at the engaging nut 18. When the armor termination assembly is fitted to the armor termination adaptor, a means is provided for preventing the armor termination assembly 20 from rotating and disengaging from the armor termination adaptor 19. A suitable means is a dowel pin 27 which is inserted through a passageway provided in the engaging threads of the armor termination assembly 20 and the armor termination adaptor 19.

During the assembly of the connector 100, the dowel pin 27 is inserted between the armor termination adaptor 19 and the armor termination assembly 20 prior to the insertion of the rectangular U-shaped dowel pins 24 and 26 through the retaining collar 17 and the armor termination adaptor 20, respectively. Thereafter, the engaging nut 18 tightens the whole assembly. A unique feature of this arrangement is the complete connection of the armored optical cable 200 to the connector assembly 100 is through the hollow tension rod 25 affixed only therebetween at the retaining collar 17 with dowel pin 24 and at the armor termination adaptor/assembly 19/20 with dowel pin 26. This permits a clean break between the connector assembly 100 and the armored optical cable 200 at the hollow tension rod 25 if the force on the cable-connector interface exceeds the breaking strength of the hollow tension rod 25. Another unique feature is the sealing means 2, 5, 10, 16, 22, 22a, 23, 23a, 23b and 23c enhance the likelihood that neither the sond nor the electronics cavity will be damaged if the cable and connector separate.

Having described the invention with reference to a particularly preferred embodiment, it should be understood that modifications which would be obvious to the ordinary skilled artisan are intended to be within the scope of the invention. For example, the threaded engaging means can be effected with gluing or welding if disassembly is not needed. In addition, the size of the cable connector and its configuration can be varied to suit the desired sond connected thereto. Furthermore, the cable connector assembly is not limited to oil well logging operations but can be used in any environment wherein high pressures are encountered and optionally high temperatures, such as oceanographic uses and/or geothermal operations.

What is claimed is:

1. A cable connector capable of detachably connecting a device to an armored optical fiber cable through a mechanical and electrical interface, said connector comprising:

a connector housing, said housing having opposed ends;

means for anchoring the armor wires of said cable at a first end of said connector housing;

a breakable link in said connector housing adjacent to said means for anchoring, said breakable link having inner passages to pass the conductor elements and the optical fiber core of said cable therethrough;

means for retaining said breakable link between said means for anchoring and a retaining collar in said connector housing;

a first means for sealing said connector housing adjacent to said retaining collar to seal said optical fiber core and said conductor elements passing therethrough within said connector housing;

means for retaining said first means for sealing in a fixed position in said connector housing;

a second means for sealing said connector housing spaced apart from said first means for sealing and forming an end of said connector housing opposed to said first end, said first and second means for sealing defining a pressure sealed electronics cavity therebetween, wherein said conductor elements and said optical fiber core passing through said first means for sealing terminate therein; and means for forming a detachable pressure tight electrical interconnection between said electronics cavity and a device on said end of said connector housing opposed to said first end.

2. The connector according to claim 1 wherein said means for forming an electrical interconnection is a multilam contact.

3. The connector according to claim 2 further including an additional means for sealing for said conductors and said optical fiber core between said first and second means for sealing, spaced apart from the first sealing means with a spacer tube and forming a pressure test cavity therebetween.

4. The connector according to claim 3 wherein said first and additional means for sealing further include a feed-through boot connected to said sealing means to further enhance the sealing of said conductor elements and said optical fiber core within said electronics cavity.

5. The connector according to claim 4 further including means for sealing said device adjacent to the interface between said device and said second means for sealing.

6. The connector according to claim 5 wherein said first, second and additional means for sealing include o-ring seals.

7. The connector according to claim 6 wherein said connector housing has a spacer tube abutting said second means for sealing and fitting within said electronics cavity, said tube spacer providing a means for mounting electrical to optical and optical to electrical conversion electronics.

8. The connector according to claim 7 wherein said breakable link is a hollow tension rod, wherein the central hollow passage in said hollow tension rod passes said optical fiber core therethrough and individual outer passages pass said conductor elements therethrough, said hollow tension rod is retained in said connector housing between an armor termination adaptor in said means for anchoring and said retaining collar with two U-shaped dowel pins at opposite ends of said hollow tension rod.

9. The connector according to claim 8 wherein said connector housing comprises a tubular front shell containing said second means for sealing threadedly joined by an engaging nut on an end opposite to an end containing said second means for sealing a tubular tension rod shell containing said hollow tension rod.

10. The connector according to claim 9 wherein said hollow tension rod is fabricated to separate said armored optical fiber cable from said connector housing at a tension which is approximately equal or less than the tension at which said armored optical cable stretches from elastic elongation to inelastic elongation.

11. The connector according to claim 10 wherein said retaining collar is retained within said tubular tension rod shell through an engaging nut threadedly joined to an outer portion of said tubular tension rod shell.

12. A cable connector for interconnecting an armored optical fiber well logging cable to a well logging sond without an optical interconnection therebetween, said connector comprising:

an armor wire termination assembly for terminating the armor wires of said cable therein;

an armor termination adaptor to connect said armor wire termination assembly to a first U-shaped dowel pin engaged in a first end of a hollow tension rod, said hollow tension rod having a central passage to pass to an optical fiber core of said cable therethrough and individual passages surrounding said central passage to pass individual conductor elements therethrough;

a second U-shaped dowel pin in an end of said hollow tension rod opposite to said first end, said second U-shaped dowel pin engaging a retaining collar, said retaining collar threadedly engaged into a tension rod-shell through an engaging nut, said opposite end of said hollow tension rod having passages to pass said optical fiber core and said conductor elements therethrough;

two spaced apart feed-through inserts in said tension rod-shell, said feed-through inserts providing a means for individually sealing said optical fiber core and said conductor elements inserted therethrough in said tension rod shell, said two feed-through inserts separated by a spacer tube to define a pressure test cavity therebetween;

a retaining nut threadedly engaged in the end of said tension rod-shell opposite to said end engaged to said engaging nut to retain said feed-through insert against said spacer tube;

a second engaging nut to threadedly engage said tension rod shell to a front shell;

means between said tension rod shell and said front shell to seal against pressure;

a pressure sealing insert in an end of said front shell opposite to the end sealed to said tension rod-shell, shell, said pressure sealing insert and said front shell defining a pressure sealed electronics cavity therebetween for terminating said optical fiber core and said conductor elements;

means for forming an electrical connection through said pressure sealing insert into said electronics cavity; and an engaging nut for threadedly engaging and forming an electrical and pressure tight contact between a well logging sond and the electronics cavity in said front shell.

13. The connector according to claim 12 wherein said hollow tension rod is fabricated to separate said armored optical fiber cable from said connector housing at a tension which is approximately equal or less than the tension at which said armored optical cable stretches from elastic elongation to inelastic elongation.

14. The connector according to claim 13 wherein electronics cavity includes a spacer tube between said pressure sealing insert and said retaining nut, said spacer tube providing a means for mounting electrical to optical and optical to electrical conversion electronics.

15. A process for transmitting an electrical signal from a well logging sond along an armored optical fiber cable comprising:

connecting a sond to the cable connector, said connector comprising a connector housing, said housing having opposed ends, means for anchoring the armor wires of said cable at a first end of said connector housing, a breakable link in said connector housing adjacent to said means for anchoring, said breakable link having inner passages to pass the conductor elements and the optical fiber core of said cable therethrough, means for retaining said breakable link between said means for anchoring and a retaining collar in said connector housing, a first means for sealing said connector housing adjacent to said retaining collar to seal said optical fiber core and said conductor elements passing therethrough within said connector housing, means for retaining said first means for sealing in a fixed position in said connector housing, a second means for sealing said connector housing spaced apart from said first means for sealing and forming an end of said connector housing opposed to said first end, said first and second means for sealing defining a pressure sealed electronics cavity therebetween, wherein said conductor elements and said optical fiber core passing through said first means for sealing terminate therein, said electronics cavity contains means for converting optical to electrical signals and electrical to optical signals, means for forming a detachable pressure tight electrical interconnection between said electronics cavity and said sond on said end of said connector housing opposed to said first end;

converting said electrical signal from said sond into an optical signal; and transmitting said optical signal through the optical fibers in said armored optical fiber cable.

16. The process according to claim 15 further comprising transmitting an optical signal through said optical fibers to said connector; converting said optical signals to electrical signals in said connector; and transmitting said electrical signals to said sond.

17. In a process of connecting an armored optical fiber cable to a device through a cable connector, the improvement which comprises:

connecting said cable to said connector through a breakable link, said breakable link having a central passage therethrough for the optical fiber core in said cable, said breakable link fabricated to separate said cable from said connector at a tension which is about equal or less than to the tension at which said cable stretches from elastic elongation to inelastic elongation.

* * * * *